Oct. 30, 1923.

P. W. T. R. THOMSON 1,472,536

EDUCATIONAL BUILDING BLOCK

Filed Aug. 31, 1921

INVENTOR
PHILIP W.T.R.THOMSON
BY Herman Miller
ATTORNEY.

Patented Oct. 30, 1923.

1,472,536

UNITED STATES PATENT OFFICE.

PHILIP W. T. R. THOMSON, OF HOLLYWOOD, CALIFORNIA.

EDUCATIONAL BUILDING BLOCK.

Application filed August 31, 1921. Serial No. 497,329.

*To all whom it may concern:*

Be it known that I, PHILIP W. T. R. THOMSON, a subject of the King of Great Britain, residing at Hollywood, in the county of Los Angeles and State of California, have invented new and useful Improvements in Educational Building Blocks, of which the following is a specification.

My invention relates to an educational device in the nature of building blocks of cubical form that are adapted to be combined to produce various figures or objects and which blocks may be advantageously employed for the instruction and entertainment of children as well as for advanced pupils in the study of higher mathematics, stereometry, symbology, botany, stereochemistry, molecular forms and structures and other sciences.

Further objects of my invention are to provide building blocks that may be easily and cheaply produced, to provide means whereby the blocks may be readily connected or disconnected and further to provide building blocks that are uniform in size and shape thereby enabling them to be advantageously utilized in the formation of various sectional objects in which may be found points, lines, plane surfaces, and the like.

With the foregoing and other objects in view my invention consists in certain novel features and arrangement of parts that will be hereinafter more fully described and claimed and illustrated in the accompanying drawings in which:

Figure 1:
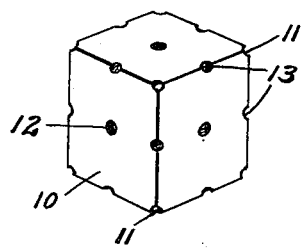
Fig. 1 is a perspective view of a building block constructed in accordance with my invention.
Figure 2:
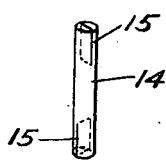
Fig. 2 is a perspective view of one of the pins or pegs that form a connection between the blocks.
Figure 3:
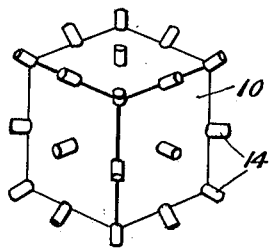
Fig. 3 is a perspective view of one of the blocks with connecting members seated in the apertures therein.

The building block contemplated by my invention comprises a cubical body 10 of any desired size and material and formed in the eight corners of the cubical body are relatively small apertures 11, which extend towards the center of the blocks. Formed in the center of each face of the block is an aperture such as 12, the same being extended toward the center of the block and formed on the edges of the block between the corners thereof are apertures 13 which project toward the center of said block.

Thus each block is provided with 26 apertures and as the apertures 12 are located at central points on the faces of the block and apertures 13 are located at points half way between the corners of the block, all of the alined apertures are arranged equal distances apart.

The members utilized for connecting the blocks are in the form of small pins or pegs 14 made of wood or metal and formed in the end portions thereof are longitudinally disposed slots 15 and with the slot in one end arranged substantially at right angles to the slot in the other end. The slotting of the ends of the pins or pegs provide a pair of resilient fingers at each end of the pin or peg, which fingers will move toward each other to a slight degree when inserted in the apertures in the blocks thus creating a certain amount of tension that will act to retain the pins in said blocks.

By virtue of the construction of the blocks and the connecting pins or pegs it is possible to assemble a number of the blocks in various arrangement and to simulate various forms in nature.

Figure 4:
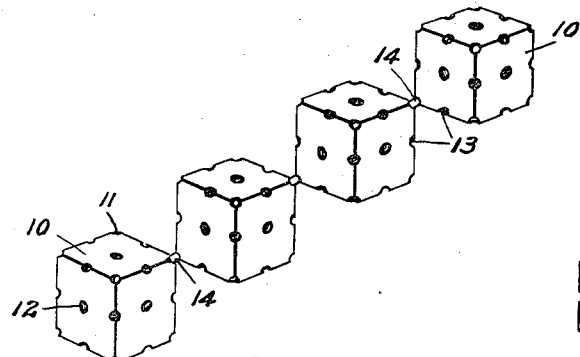
Fig. 4 is a perspective view of a series of the blocks that are connected to each other by pins or pegs seated in the adjacent corners of said blocks.
Figure 5:
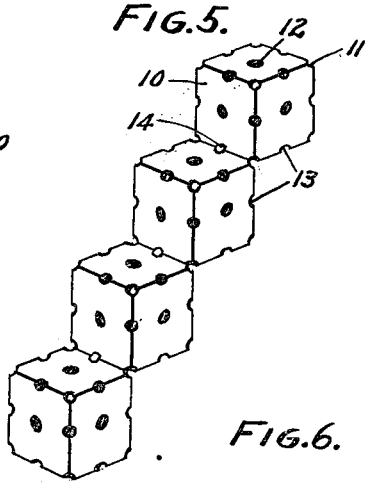
Fig. 5 is a perspective view of a series of blocks connected to each other by pins or pegs seated in their adjacent edges.
Figure 6:
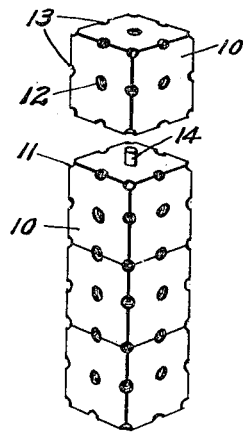
Fig. 6 is a perspective view showing a series of the blocks arranged in super-imposed relationship and with the uppermost block detached from the next adjacent block.
Figure 7:
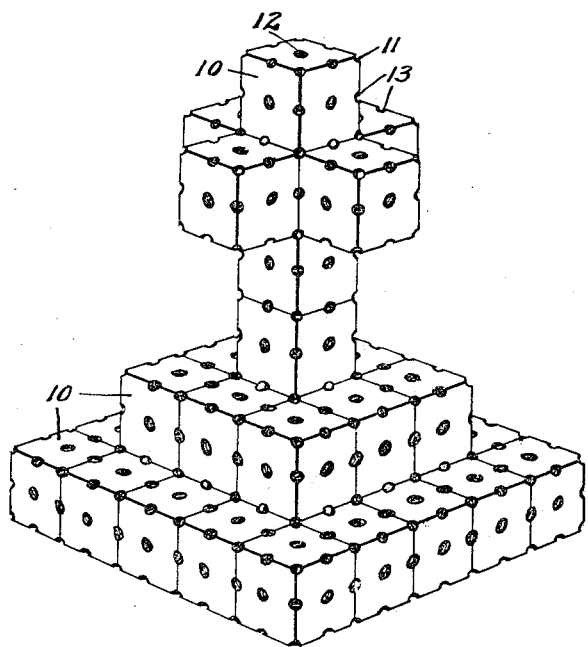
Fig. 7 is a perspective view of a series of blocks arranged to form a substantially rectangular base and a cross surmounting the same.

The blocks may be assembled face to face, as illustrated in Fig. 6; edge to edge, as illustrated in Fig. 5; corner to corner, as illustrated in Fig. 4; or a number of the blocks may be assembled to form a symmetrical angular structure as illustrated in Fig. 7.

Thus it will be seen that I have provided a relatively simple and practical device that may be used as an interesting play thing for children as well as in scientific research and study and particularly in higher mathematics, stereometry, symbology and the study of crystalized and symmetrical angular structures.

Educational building blocks of my construction may be easily and cheaply produced, are capable of being readily assembled and taken apart, and if desired each set of blocks may include a certain number that are differently and distinctively colored thereby adding materially to the appearance of the structure produced by a number of assembled blocks.

While I have shown and described my invention as being applied to building blocks it will be understood that practically the same idea may be employed in blocks of any desired shape, that is, either regular or irregular polyhedrons.

Various changes may be made in the details of construction by those skilled in the art, without departing from the spirit of my invention as set forth in the appended claims.

What is claimed is:

1. An educational device comprising a plurality of cubical blocks each provided in its faces, its corners, and its edges with peg receiving recesses.

2. An educational device comprising a plurality of cubical blocks each provided in its faces, its corners, and its edges with recesses all of which extend toward the center of the block.

3. An educational device comprising a plurality of blocks of cubical form each of which is provided in its corners with recesses and pins adapted to be positioned in said recesses to retain the blocks in assembled relation and with the corner of one block immediately adjacent the corner of the next adjacent block.

4. In an educational device, a plurality of cubical blocks each of which is provided at its corners and on each of its edges with recesses which extend toward the center of the block and pins adapted to be inserted in the recesses in said blocks to retain the same in assembled relation and with the edge of one block disposed adjacent the edge of the next adjacent block.

5. In an educational device, a block of polyhedrical form having its faces, corners, and edges provided with recesses all of which extend toward the center of the block.

6. In an educational device, a block of polyhedrical form having its faces, corners, and edges provided with recesses all of which extend toward the center of the block, the respective recesses being disposed centrally of the faces, corners or edges.

7. In an educational device, a block of polyhedrical form having its faces, corners and edges provided with centrally disposed recesses.

8. In an educational device, a block of polyhedrical form having its faces, corners and edges provided with centrally disposed means by which members can be applied to the block for connecting the latter to similar blocks.

9. In an educational device, a block of polyhedrical form having its faces, corners and edges provided with projections, all of which extend in a direction away from the center of the block.

In testimony whereof I have signed my name to this specification.

PHILIP W. T. R. THOMSON.